United States Patent
Fukuhara

(10) Patent No.: US 9,757,671 B2
(45) Date of Patent: Sep. 12, 2017

(54) FILTER APPARATUS FOR COMPRESSED AIR

(71) Applicant: FUKUHARA Co., Ltd., Yokohama (JP)

(72) Inventor: Hiroshi Fukuhara, Yokohama (JP)

(73) Assignee: FUKUHARA Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/383,424

(22) Filed: Dec. 19, 2016

(65) Prior Publication Data

US 2017/0232375 A1  Aug. 17, 2017

(30) Foreign Application Priority Data

Feb. 16, 2016  (JP) ................. 2016-026561

(51) Int. Cl.
B01D 46/00 (2006.01)
B01D 46/24 (2006.01)

(52) U.S. Cl.
CPC ......... *B01D 46/0021* (2013.01); *B01D 46/24* (2013.01); *B01D 2267/30* (2013.01); *B01D 2279/00* (2013.01)

(58) Field of Classification Search
CPC .. B01D 46/002; B01D 46/0021; B01D 46/24; B01D 46/2403; B01D 2267/30; B01D 2279/00
See application file for complete search history.

(56) References Cited

U.S. PATENT DOCUMENTS

2012/0273433 A1* 11/2012 Wessels ................. B01D 29/52
                                                        210/767

FOREIGN PATENT DOCUMENTS

| JP | H5-317630 A | 12/1993 |
| JP | H6-315615 A | 11/1994 |
| JP | 2001-170429 A | 6/2001 |
| JP | 2001-295960 A | 10/2001 |
| JP | 2014-237094 A | 12/2014 |

* cited by examiner

*Primary Examiner* — Robert Clemente
(74) *Attorney, Agent, or Firm* — Muncy, Geissler, Olds & Lowe, P.C.

(57) ABSTRACT

A compressed air filter apparatus includes a main flow path as a flow path in which compressed air should circulate, formed in a body to extend from a first opening into a penetration hole, an upper inner flow path extending from the penetration hole to an upper inner space, an upper inner and outer flow path extending from the upper inner space to an upper outer space to pass through an upper filer element, a communication flow path extending from the upper outer space to a lower outer space to pass through a communication hole, a secondary flow path extending from the lower outer space to a second opening, a lower inner flow path extending from the penetration hole to a lower inner space, and a lower inner and outer flow path extending from the lower inner space to the lower outer space to pass through a lower filter element.

4 Claims, 2 Drawing Sheets

A—A

250
FILTER APPARATUS FOR COMPRESSED AIR

TECHNICAL FIELD

The present invention relates to a filter apparatus for compressed air to separate impurity included therein.

BACKGROUND ART

In compressed air discharged from a pneumatic compressor such as an air compressor, drain which is condensed water or dust, or impurity such as lubricant oil used in the pneumatic compressor is included. Since the compressed air is thereafter used for a pneumatic apparatus such as an air gun or a cylinder, inclusion of such impurity could cause malfunction etc. of the pneumatic apparatus. That is, there is a possibility that inclusion of impurity becomes harmful to a future use of compressed air. Consequently, impurity in compressed air is separated or removed from the compressed air appropriately via an air filter (for example, see JP-A-Hei 6-315615).

In a compressed air pressure circuit where compressed air flows, if there is a sufficient space in a place for locating an air filter as in JP-A-Hei 6-315615, it is possible to use a large-sized air filter to improve filter efficiency. However, there is a case where this space is large enough only in the upper and lower directions, and not large enough in the right and left directions. In such a case, use of an air filter which efficiently utilizes a space in the upper and lower directions is preferable. As such a filter, there is one in which filters are respectively provided in the upper and lower directions to an inflow direction and an outflow direction of compressed air (for example, see JP-A-2014-237094).

DISCLOSURE OF INVENTION

However, in a filter apparatus of JP-A-2014-237094, different filter elements are provided on the upper side and the lower side, and compressed air passes through upper and lower filters. This means that compressed air passes through the filter elements twice, which is problematic in terms of pressure loss. In this way, the configuration of a flow path which applies pressure loss causes a decrease of the flow rate of compressed air per hour.

The present invention is made considering the above prior art, and an object of the present invention is to provide a filter apparatus for compressed air which effectively utilizes upper and lower spaces and eliminates a cause of pressure loss when compressed air circulates as much as possible, so that compressed air of a large flow rate can flow per hour.

In order to achieve the above object, the present invention provides a filter apparatus for compressed air including: a horizontal reference surface; a body disposed to include the reference surface; a penetration hole penetrating the body in a vertical direction to allow upper and lower surfaces of the body to communicate; a first opening and a second opening disposed on a lateral side of the body to include the reference surface; an upper bowl and a lower bowl respectively covering upper and lower spaces of the body; an upper filter element and a lower filter element disposed in the upper bowl and the lower bowl, respectively; an upper outer space and an upper inner space in the upper bowl partitioned by the upper filter element; a lower outer space and a lower inner space in the lower bowl partitioned by the lower filter element; a communication hole formed to penetrate the body separated from the penetration hole to communicate the upper outer space and the lower outer space; and a drain hole provided to open at a lower end of the lower bowl; the filter apparatus for compressed air further including: a main flow path, which is formed as a flow path in which compressed air should circulate, formed in the body to extend from the first opening into the penetration hole; an upper inner flow path extending from the penetration hole to the upper inner space; an upper inner and outer flow path extending from the upper inner space to the upper outer space to pass through the upper filer element; a communication flow path extending from the upper outer space to the lower outer space to pass through the communication hole; and a secondary flow path formed in the body to extend from the lower outer space to the second opening, the filter apparatus for compressed air further including: a lower inner flow path formed as a flow path in which compressed air should circulate to extend from the penetration hole to the lower inner space; and a lower inner and outer flow path extending from the lower inner space to the lower outer space to pass through the lower filter element.

Preferably, an inclined portion inclining toward the communication hole is formed at an upper side of the body.

Preferably, the upper bowl is formed in the same shape as the lower bowl to be mutually exchangeable, the upper filter element and the lower filter element are formed in the same shape to be mutually exchangeable, and the upper adapter and the lower adapter for attaching the upper filter element and the lower filter element to the body are formed in the same shape to be mutually exchangeable.

According to the present invention, since a flow path of compressed air passing through the filter elements is formed to extend in the upper and lower directions, upper and lower spaces can be effectively utilized even when a space for locating the filter apparatus is not large enough in the right and left directions in the compressed air pressure circuit. In addition, since the compressed air is branched in the upper and lower directions in the filter apparatus to respectively pass through the upper filter element and the lower filter element, compressed air of a large flow rate can flow per hour. Also, the compressed air passes through only one filter element in the filter apparatus, and further, the number of times of bending as a flow path is decreased as much as possible, whereby increase of pressure loss when the compressed air circulates can be prevented. In addition, the first opening or the second opening which is an inlet port or an outlet port of the compressed air is disposed at the same height since these openings include the same reference surface. Accordingly, height adjustment of piping in communication with other apparatuses becomes easy without any complex piping structure of the compressed air pressure circuit including the filter apparatus.

Further, the second opening communicates with only the lower outer space via the secondary flow path. Due to this, if the second opening is the outlet port of the compressed air (that is, when the first opening is the inlet port of the compressed air), the compressed air which has passed through the upper filter element or the lower filter element needs to move upward in the secondary flow path from the lower outer space when it is discharged from the second opening. Consequently, drain included in the compressed air drops under its own weight at this stage, whereby drain can be effectively separated from the compressed air. On the other hand, if the second opening is the inlet port of the compressed air, the compressed air firstly moves downward to flow into the lower outer space. Here, drain naturally drops. Further, since the compressed air needs to move upward when it passes through the communication flow path toward the upper outer space, most of drain can drop from the compressed air before passing through the upper filter element. Also, drain attached to the upper filter element or the lower filter element naturally drops and is discharged from the drain hole.

Moreover, by providing the inclined portion on the upper side of the body, drain generated in the upper outer space can be guided effectively to the communication flow path along the inclined portion, and the drain can be discharged from the drain hole. Moreover, if the first opening is the inlet port of the compressed air, the compressed air can be effectively guided to the lower outer space.

In addition, by forming the upper bowl and the lower bowl in the same shape to be mutually exchangeable, only a bowl with one shape needs to be formed and this can be applied to both, which improves production efficiency. In this case, the drain hole formed in the lower bowl may be utilized as a hole for communicating with a manometer or a differential pressure gauge etc. Moreover, by forming the upper filter element and the lower filter element in the same shape and further forming the upper adapter and the lower adapter for attaching the upper filter element and the lower filter element to the body in the same shape, a filter element with one shape and an adapter with one shape may be formed to be applied to both, which further improves production efficiency.

BEST MODE FOR CARRYING OUT THE INVENTION

Figure 1:
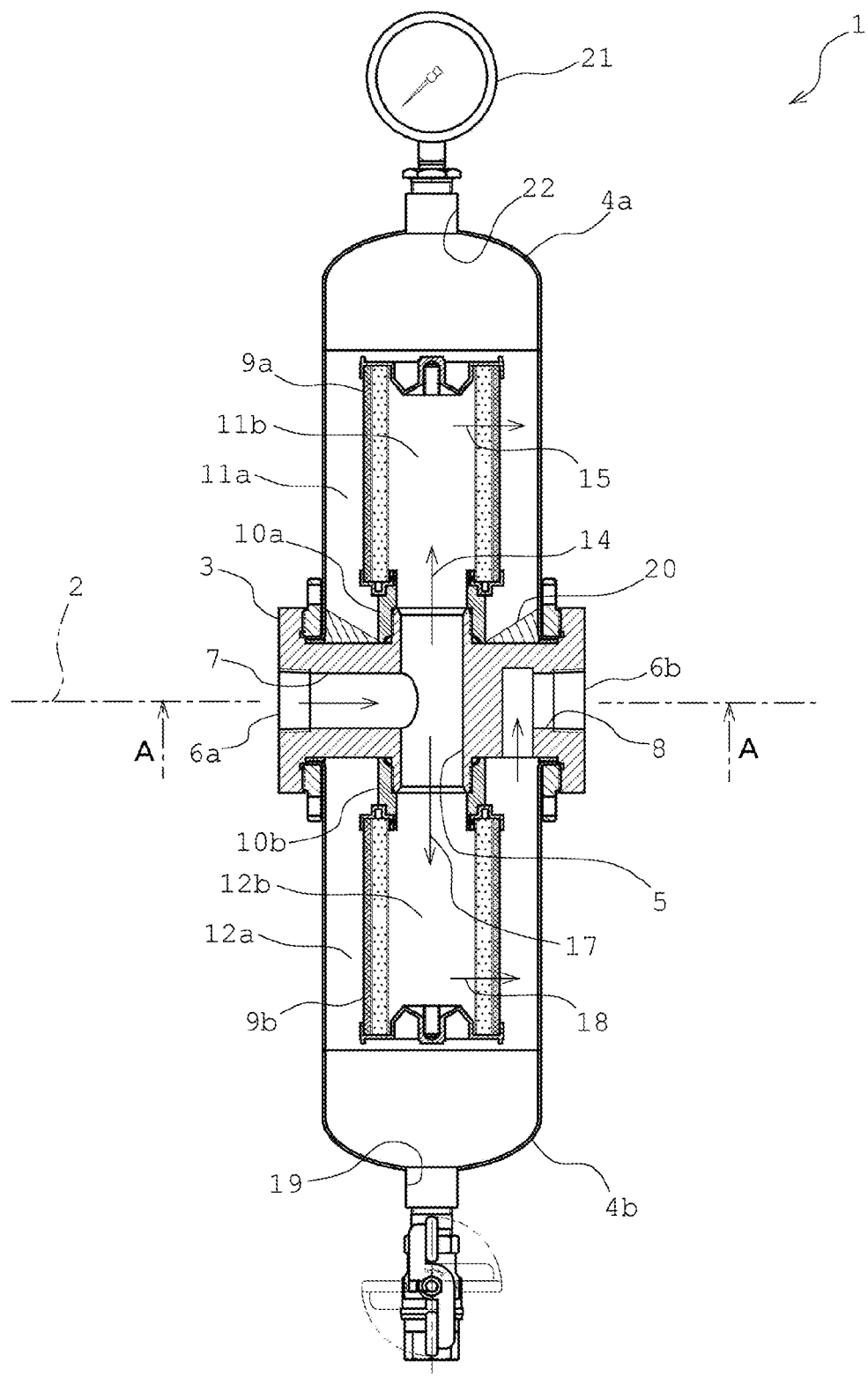
FIG. 1 is a schematic cross-sectional view of a filter apparatus for compressed air according to the present invention.
Figure 2:
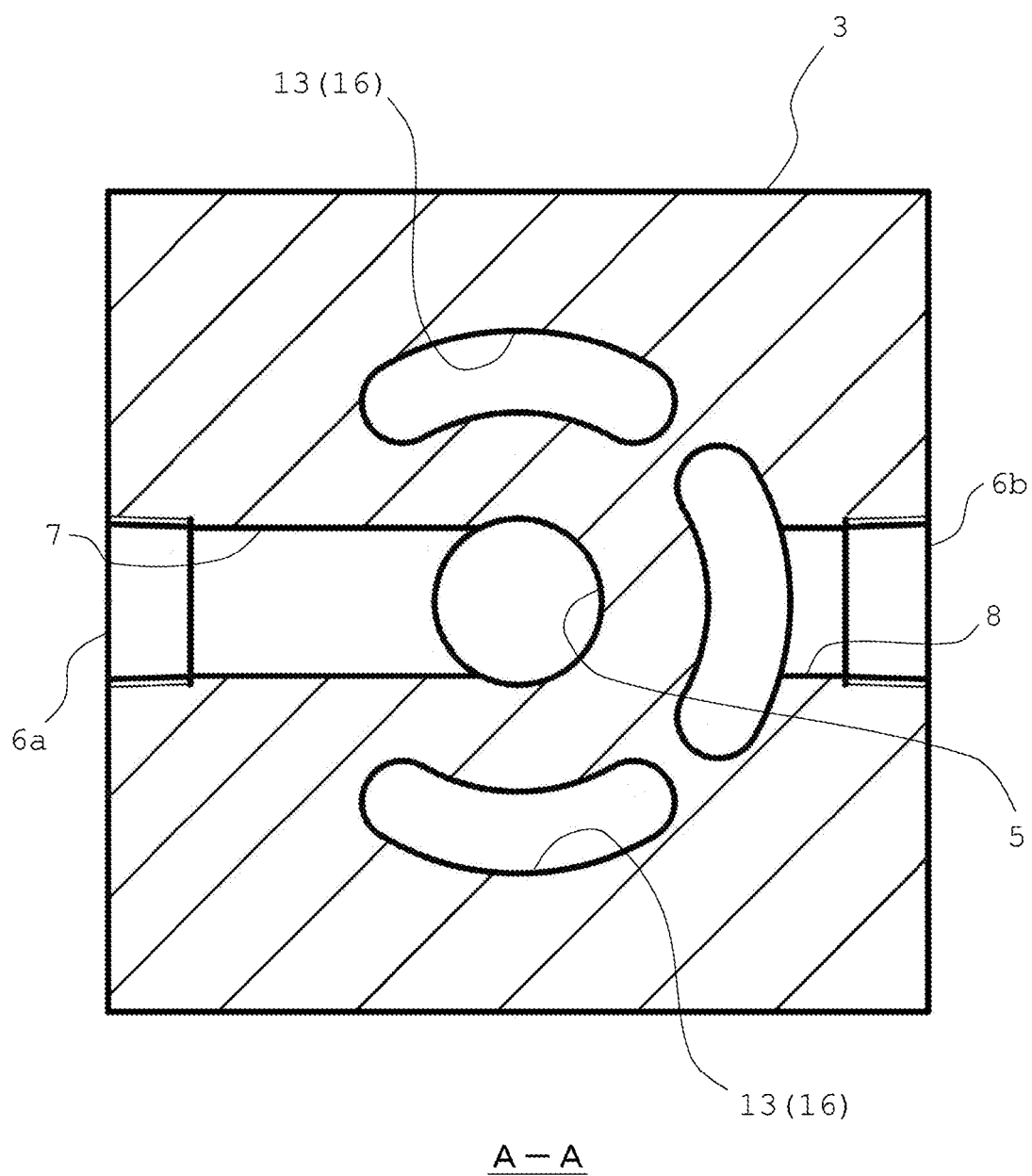
FIG. 2 is a cross-sectional view taken along the line A-A of FIG. 1.

As shown in FIGS. 1 and 2, a filter apparatus for compressed air 1 according to the present invention has a horizontal reference surface 2, and is formed extending in the upper and lower directions (a vertical direction) while using this reference surface 2 as a border. More specifically, a body 3 is provided to include the reference surface 2, and to this body 3, an upper bowl 4a and a lower bowl 4b are respectively attached in the upper and lower directions. The body 3 has a substantially square pillar shape, and a penetration hole 5 piercing vertically is formed at its center. Consequently, the penetration hole 5 allows upper and lower surfaces of the body 3 to communicate. At lateral sides of the body 3, a first opening 6a and a second opening 6b are formed. These first opening 6a and second opening 6b have a substantially circular shape, and are formed at a position including the reference surface 2. For example, the first opening 6a and the second opening 6b are formed such that their diameters are at the same position as the reference surface 2. The first opening 6a is formed as an open end surface of a main flow path 7 formed in the body 3 to extend to the penetration hole 5. The main flow path 7 communicates with a substantial center of the penetration hole 5 in its piercing direction. The second opening 6b does not communicate with the penetration hole 5 and is formed as an open end surface of a secondary flow path 8 extending to a lower surface of the body 3. Specifically, in the secondary flow path 8, a flow path is formed extending from the second opening 6b in the horizontal direction, that is, along the reference surface 2, to the center direction of the body 3, bending substantially 90° downward just before reaching the penetration hole 5, and extending to a lower end surface of the body 3.

Upper and lower spaces of the body 3 are respectively covered by the above-described upper bowl 4a and lower bowl 4b. The upper bowl 4a and the lower bowl 4b are closely attached to the body 3 to hermetically seal the upper and lower spaces of the body 3, respectively. In the upper bowl 4a and the lower bowl 4b, an upper filter element 9a and a lower filter element 9b are respectively disposed. The upper filter element 9a and the lower filter element 9b are attached to the upper side and the lower side of the body 3, respectively, via an upper adapter 10a and a lower adapter 10b. The upper adapter 10a and the lower adapter 10b have a substantially cylindrical shape, and are attached to the body such that their inner portions communicate with the penetration hole 5. The upper filter element 9a and the lower filter element 9b have a substantially cylindrical shape formed with a filter material shaped as mesh or a hollow fiber membrane, and are respectively attached to the upper adapter 10a and the lower adapter 10b to communicate with the penetration hole 5 via an inner portion of the upper adapter 10a and the lower adapter 10b.

The upper bowl 4a is partitioned into an upper outer space 11a and an upper inner space 11b by the upper filter element 9a. That is, the upper filter element 9a is interposed between the upper outer space 11a and the upper inner space 11b. On the other hand, the lower bowl 4b is partitioned into a lower outer space 12a and a lower inner space 12b by the lower filter element 9b. That is, the lower filter element 9b is interposed between the lower outer space 12a and the lower inner space 12b.

In the body 3, a communication hole 13 penetrating the body 3 separately from the penetration hole 5 to communicate the upper outer space 11a and the lower outer space 12a is formed. From this configuration, while the main flow path 7 communicates with the upper inner space 11b and the lower inner space 12b via the penetration hole 5, the secondary flow path 8 communicates with only the lower outer space 12a, and does not directly communicate with the upper outer space 11a.

That is, if the first opening 6a is used as an inlet port of compressed air, the compressed air extends from the first opening 6a to an inner portion of the penetration hole 5 and firstly passes through the main flow path 7 formed in the body 3. Then, a flow path is branched in the penetration hole 5. One part of the compressed air passes through an upper inner flow path 14 extending from the inner portion of the penetration hole 5 to the upper inner space 11b. Thereafter, it passes through an upper inner and outer flow path 15 extending from the upper inner space 11b to the upper outer space 11a (that is, it passes through the upper filter element 9a). After that, it passes through a communication flow path 16 in the communication hole 13 extending from the upper outer space 11a to the lower outer space 12a. Another part of the compressed air which has passed through the main flow path 7 passes through a lower inner flow path 17 extending from the inner portion of the penetration hole 5 to the lower inner space 12b. Thereafter, it passes through a lower inner and outer flow path 18 extending from the lower inner space 12b to the lower outer space 12a (that is, it passes through the lower filter element 9b). The compressed air branched into the upper inner flow path 14 and the lower inner flow path 17 in the penetration hole 5 joins together again at the lower outer space 12a after passing through the communication flow path 16 and the lower inner and outer flow path 18. Then, passing through the secondary flow path 8 from the lower outer space 12a, it is discharged from the second opening 6a. Additionally, in FIG. 1, the directions of arrows are described taking a case where the first opening 6a is the inlet port of the compressed air as an example. In a case where the second opening 6b is the inlet port of the compressed air, a reverse flow path is generated.

From the above, since a flow path of compressed air passing through the upper filter element 9a and the lower filter element 9b is branched in the upper and lower directions in the penetration hole 5, upper and lower spaces can be effectively utilized even when a space for locating the filter apparatus 1 is not large enough in the right and left directions in the compressed air pressure circuit. In addition, since the compressed air is branched in the upper and lower directions in the filter apparatus 1 to respectively pass through the upper filter element 9a and the lower filter element 9b, compressed air of a large flow rate can flow per hour. Also, the compressed air passes through only one filter element (the upper filter element 9a or the lower filter element 9b) in the filter apparatus 1, and further, the number of times of bending as a flow path is decreased as much as possible, whereby increase of pressure loss when the compressed air circulates can be prevented. Especially, the flow path passing through the lower inner flow path 17 has only four times as the number of times of bending, which achieves a significant reduction as pressure loss. In addition, the first opening 6a or the second opening 6b which is the inlet port or an outlet port of the compressed air is disposed at the same height since these openings include the same reference surface 2. Accordingly, height adjustment of piping in communication with other apparatuses becomes easy without any complex piping structure of the compressed air pressure circuit including the filter apparatus 1.

Further, the second opening 6b communicates with only the lower outer space 12a via the secondary flow path 8. Due to this, if the second opening 6b is the outlet port of the compressed air (that is, when the first opening 6a is the inlet port of the compressed air), the compressed air which has passed through the upper filter element 9a or the lower filter element 9b needs to move upward in the secondary flow path 8 from the lower outer space 12a when it is discharged from the second opening 6b. Consequently, drain included in the compressed air drops under its own weight at this stage, whereby drain can be effectively separated from the compressed air. On the other hand, if the second opening 6b is the inlet port of the compressed air, the compressed air firstly moves downward to flow into the lower outer space 12a. Here, drain naturally drops. Further, since the compressed air needs to move upward when it passes through the communication flow path 16 toward the upper outer space 11a, most of drain can drop from the compressed air before passing through the upper filter element 9a. Also, drain attached to the upper filter element 9a or the lower filter element 9b naturally drops. At a lower end of the lower bowl 4b, an open drain hole 19 is provided, and the dropped drain is discharged from this drain hole 19.

Moreover, on the upper side of the body 3, an inclined portion 20 inclining downward toward the communication hole 13 may be formed. The inclined portion 20 is formed at a position to be housed in the upper bowl 4a, and more specifically, it is provided at a lower portion of the upper outer space 11a. The communication hole 13 is disposed at a portion where the inclined portion 20 terminates downward inclination. By providing such inclined portion 20, drain generated in the upper outer space 11a can be guided effectively to the communication flow path 16 along the inclined portion 20, and the drain is allowed to drop directly to be discharged from the drain hole 19. Moreover, if the first opening 6a is the inlet port of the compressed air, the compressed air can be effectively guided from the upper outer space 11a to the lower outer space 12a.

Here, the upper bowl 4a may be formed in the same shape as the lower bowl 4b to be mutually exchangeable. If the upper bowl 4a and the lower bowl 4b are formed in the same shape, the upper bowl has the same hole as the drain hole 19 at its upper end; however, this may be utilized as a connection port 22 to be connected with a differential pressure gauge (a manometer) 21. By forming the upper bowl 4a and the lower bowl 4b in the same shape to be mutually exchangeable, only a bowl with one shape needs to be formed at a manufacture stage and this can be applied to both, which improves production efficiency. Moreover, the upper filter element 9a and the lower filter element 9b may be formed in the same shape to be mutually exchangeable, and further, the upper adapter 10a and the lower adapter 10b may be formed in the same shape to be mutually exchangeable. By doing this, a filter element with one shape and an adapter with one shape may be formed to be applied to both, which further improves production efficiency.

The invention claimed is:

1. A filter apparatus for compressed air, comprising:
a horizontal reference surface;
a body disposed to include the reference surface;
a penetration hole penetrating the body in a vertical direction to allow upper and lower surfaces of the body to communicate;
a first opening and a second opening disposed on a lateral side of the body to include the reference surface;
an upper bowl and a lower bowl respectively covering upper and lower spaces of the body;
an upper filter element and a lower filter element disposed in the upper bowl and the lower bowl, respectively;
an upper outer space and an upper inner space in the upper bowl partitioned by the upper filter element;
a lower outer space and a lower inner space in the lower bowl partitioned by the lower filter element;
a communication hole formed to penetrate the body separated from the penetration hole to communicate the upper outer space and the lower outer space; and
a drain hole provided to open at a lower end of the lower bowl,
the filter apparatus for compressed air further comprising:
a main flow path, which is formed as a flow path in which compressed air should circulate, formed in the body to extend from the first opening into the penetration hole; an upper inner flow path extending from the penetration hole to the upper inner space; an upper inner and outer flow path extending from the upper inner space to the upper outer space to pass through the upper filer element; a communication flow path extending from the upper outer space to the lower outer space to pass through the communication hole; and a secondary flow path formed in the body to extend from the lower outer space to the second opening,
the filter apparatus for compressed air further comprising:
a lower inner flow path formed as a flow path in which compressed air should circulate to extend from the penetration hole to the lower inner space; and a lower inner and outer flow path extending from the lower inner space to the lower outer space to pass through the lower filter element.

2. The filter apparatus for compressed air as recited in claim 1, wherein an inclined portion inclining toward the communication hole is formed at an upper side of the body.

3. The filter apparatus for compressed air as recited in claim 1, wherein the upper bowl is formed in the same shape as the lower bowl to be mutually exchangeable, the upper filter element and the lower filter element are formed in the same shape to be mutually exchangeable, and an upper adapter and a lower adapter for attaching the upper filter element and the lower filter element to the body are formed in the same shape to be mutually exchangeable.

4. The filter apparatus for compressed air as recited in claim 2, wherein the upper bowl is formed in the same shape as the lower bowl to be mutually exchangeable, the upper filter element and the lower filter element are formed in the same shape to be mutually exchangeable, and an upper adapter and a lower adapter for attaching the upper filter element and the lower filter element to the body are formed in the same shape to be mutually exchangeable.

\* \* \* \* \*